US011976789B2

(12) United States Patent
Liang et al.

(10) Patent No.: US 11,976,789 B2
(45) Date of Patent: May 7, 2024

(54) SYSTEM AND METHOD FOR CRYOGENIC VAPORIZATION USING AMBIENT AIR VAPORIZER

(71) Applicants: Chao Liang, East Amherst, NY (US); Lee J. Rosen, Buffalo, NY (US); Seth A. Potratz, Grand Island, NY (US); Hanfei Tuo, East Amherst, NY (US); Rakesh Ranjan, Austin, TX (US)

(72) Inventors: Chao Liang, East Amherst, NY (US); Lee J. Rosen, Buffalo, NY (US); Seth A. Potratz, Grand Island, NY (US); Hanfei Tuo, East Amherst, NY (US); Rakesh Ranjan, Austin, TX (US)

(73) Assignee: Praxair Technology, Inc., Danbury, CT (US)

( * ) Notice: Subject to any disclaimer, the term of this patent is extended or adjusted under 35 U.S.C. 154(b) by 332 days.

(21) Appl. No.: 17/517,110

(22) Filed: Nov. 2, 2021

(65) Prior Publication Data

US 2022/0290816 A1 Sep. 15, 2022

Related U.S. Application Data

(60) Provisional application No. 63/159,599, filed on Mar. 11, 2021.

(51) Int. Cl.
*F17C 9/04* (2006.01)

(52) U.S. Cl.
CPC ........ *F17C 9/04* (2013.01); *F17C 2223/0161* (2013.01); *F17C 2250/032* (2013.01); *F17C 2250/0631* (2013.01)

(58) Field of Classification Search
CPC ................ F17C 9/04; F17C 2223/0161; F17C 2223/033; F17C 2250/032;
(Continued)

(56) References Cited

U.S. PATENT DOCUMENTS

| | | | |
|---|---|---|---|
| 5,390,500 A | 2/1995 | White et al. | |
| 6,644,041 B1 | 11/2003 | Eyermann | |

(Continued)

FOREIGN PATENT DOCUMENTS

| | | |
|---|---|---|
| CN | 205505842 U | 8/2016 |
| CN | 210107040 U | 2/2020 |

(Continued)

*Primary Examiner* — Emmanuel E Duke
(74) *Attorney, Agent, or Firm* — Robert J. Hampsch

(57) ABSTRACT

A vaporization system and control method are provided. Liquid cryogen is provided to first ambient air vaporizer (AAV) units. When an output superheated vapor temperature is less than a threshold, the liquid cryogen is provided to second AAV units. When greater than or equal to the threshold, it is determined whether the second AAV units are defrosted. When defrosted, the liquid cryogen is provided to the second AAV units. When not defrosted, it is determined whether ice has formed on the first AAV units. When not formed, it is again determined whether the superheated vapor temperature is less than the threshold. When formed, it is determined whether a current ambient condition is favorable to defrosting the second AAV units. When not favorable, the liquid cryogen is provided to the second bank of AAV units. When favorable, it is again determined whether the superheated vapor temperature is less than the threshold.

11 Claims, 5 Drawing Sheets

(58) Field of Classification Search
CPC ...... F17C 2250/0631; F17C 2250/0439; F17C 7/04; F17C 2225/0115; F17C 2225/036; F17C 2227/0311; F17C 2227/0316; F17C 2227/0323; F17C 2227/0393; F17C 2227/0397; F17C 2260/032; F17C 2265/05
See application file for complete search history.

(56) References Cited

U.S. PATENT DOCUMENTS

| | | | | |
|---|---|---|---|---|
| 8,069,677 | B2 | 12/2011 | Faka | |
| 8,662,149 | B1 | 3/2014 | Bernert, Jr. et al. | |
| 8,776,535 | B1 | 7/2014 | Bernert, Jr. et al. | |
| 2008/0250795 | A1* | 10/2008 | Katdare .................... | F17C 9/02 62/50.2 |
| 2009/0126372 | A1 | 5/2009 | Faka | |
| 2009/0165468 | A1* | 7/2009 | Wiindaarden ............. | F17C 5/06 62/53.2 |
| 2010/0043453 | A1 | 2/2010 | Mak | |
| 2010/0101240 | A1 | 4/2010 | Mak | |
| 2013/0111928 | A1 | 5/2013 | Bernert, Sr. et al. | |
| 2021/0356196 | A1* | 11/2021 | Drube ....................... | F17C 9/02 |

FOREIGN PATENT DOCUMENTS

| | | | |
|---|---|---|---|
| DE | 4025138 | A1 | 2/1992 |
| JP | 2010-203520 | A | 9/2010 |

* cited by examiner

SYSTEM AND METHOD FOR CRYOGENIC VAPORIZATION USING AMBIENT AIR VAPORIZER

TECHNICAL FIELD

The present disclosure relates generally to cryogenic vaporization systems, and more particularly, to a system for cryogenic vaporization having ambient air vaporizers (AAVs) arranged in parallel.

BACKGROUND

A typical cryogenic regasification system, as shown in FIG. 1, includes a liquid cryogen storage tank 102 that outputs liquid cryogen to a heat exchanger (or vaporizer) 106 via a control valve 104. The control valve 104 can be upstream or downstream of the heat exchanger 106 and controls the flow of the liquid cryogen to the heat exchanger 106. The heat exchanger 106 vaporizes the liquid cryogen into superheated vapor. The superheated vapor is supplied to an end user through a pipeline. Categorization of the heat exchanger 106 is dependent on a heating medium that is used for vaporization. For example, ambient air is used as a heating medium for an AAV, and water, or a fluid mixture designed to avoid freezing pending ambient conditions, is used as a heating medium for a water bath vaporizer (WBV).

If a regasification system is continuously used to supply vaporized gas to an end user, it is referred to as a continuous supply system. If a regasification system is used only when a plant is shut down, it is referred to as a back-up system. A back-up system can also be used for “peak shaving” to supply vaporized gas to a end user for a period of time when the end user’s demand exceeds the capacity of the plant. A pipeline within the regasification system is typically made of stainless steel or another cryogenically appropriate material. However, a pipeline to the end user is typically made of carbon steel, which may become brittle at lower temperatures. Therefore, typical piping standards specify a minimum design temperature for carbon steel.

An AAV is an atmospheric vaporizer system that includes one or more passes of vertically positioned tubes or modules, or a bank of AAV units. The exteriors of the tubes are exposed to the ambient atmosphere and have an extended heat transfer surface. The liquid cryogen flows within the tubes where it is vaporized and subsequently superheated, sometimes approaching the ambient atmospheric temperature.

AAV units offer significant advantages over other heat exchangers including, for example, low equipment costs, simple and reliable operation, low maintenance, and low operating costs. However, AAV units suffer from several drawbacks including, for example, a large size and footprint due to low heat transfer performance and decreased performance from ice formation on the tube surfaces. AAV units may suffer from an extreme sensitivity to ambient conditions. AAV units may also produce certain safety hazards, such as, for example, falling ice chunks and fogging when cooler and heavier air forms a “ground air layer” beneath moist warmer air. The cool air collecting around the vaporizer will considerably reduce performance to unacceptable levels during long operation periods.

As described above, while an AAV unit is in operation, frost formation may occur on the surface of finned tubes resulting in capacity degradation over time. In order to defrost the tubes, and hence, restore vaporizer capacity, AAV units may be configured in parallel, such that one bank is in operation while the other bank is idle in order to defrost.

FIG. 2 is a diagram illustrating a typical AAV regasification system. A liquid cryogen storage tank 202 stores liquid cryogen and provides the liquid cryogen to first and second parallel lines. On the first line, a first control valve 204 controls the flow of the liquid cryogen to a first bank of AAV units 206. On the second line, a second control valve 208 controls the flow of the liquid cryogen to a second bank of AAV units 210. Only one of the first and second parallel lines is operative at a given time, and thus, when one control valve is open, the other control valve is closed.

After the first and second lines are rejoined, a temperature sensor, such as for example, a resistance temperature detector (RTD) 212, measures a discharge temperature of the superheated vapor that is output from the duty (operational) bank of AAV units (e.g., the first bank of AAV units 206 or the second bank of AAV units 210). A signal X3 indicating the measured temperature may be sent from the temperature sensor 212 to a processor or controller.

A timer 214 tracks a runtime of the duty bank of AAV units (e.g., the first bank of AAV units 206 or the second bank of AAV units 210). A signal Z2 indicating the runtime may be sent from the timer 214 to the processor or controller. Based on one or more of the discharge temperature and the runtime, the processor or controller may send the first control signal 228 to the first control valve 204, and may send the second control signal 230 to the second control valve 208, to switch the idle and duty banks of AAV units.

FIGS. 3A-3C are flowcharts illustrating conventional control methods for an AAV regasification system. As shown in FIG. 3A, the control method may be time-based, and a fixed period of time is preset as a set-point SP1 for switching banks of AAV units (e.g., a switching cycle). The duty bank of AAV units operates or runs until the runtime reaches the set-point SP1. Specifically, at 302, it is determined whether the duty bank runtime is greater than the set-point SP1. When the duty bank runtime is greater than the set-point SP1, control signals are sent to the control valves to switch the idle and duty banks of AAV units, at 304.

For example, referring back to FIG. 2, when the signal Z2 indicates that a count of the timer 214 exceeds the set-point SP1, the processor or controller sends the first control signal 228 to the first control valve 204 and sends the second control signal 230 to the second control valve 208. When the first line is operational and the second line is idle, the first control signal 228 closes the open first control valve 204 and the second control signal 230 opens the closed second control valve 208, thereby making the second line operational and the first line idle. When the second line is operational and the first line is idle, the first control signal 228 opens the closed first control valve 204 and the second control signal 230 closes the open second control valve 208, thereby making the first line operational and the second line idle.

As shown in FIG. 3B, the conventional control method may be temperature-based, and a fixed temperature is preset as a set-point SP2 for switching banks of AAV units. The duty bank of AAV units runs until a discharge temperature of the superheated vapor drops below the set-point SP2. Specifically, at 306, it is determined whether the discharge temperature of the superheated vapor from the duty bank of AAV units is less than the set-point SP2. When the discharge temperature is less than the set-point SP2, control signals are sent to the control valves to switch the idle and duty banks of AAV units, at 308.

For example, referring back to FIG. 2, when the temperature indicated by the signal X3 falls below the set-point SP2, the processor or controller sends the first control signal 228 to the first control valve 204 and sends the second control signal 230 to the second control valve 208. When the first line is operational and the second line is idle, the first control signal 228 closes the open first control valve 204 and the second control signal 230 opens the closed second control valve 208, thereby making the second line operational and the first line idle. When the second line is operational and the first line is idle, the first control signal 228 opens the closed first control valve 204 and the second control signal 230 closes the open second control valve 208, thereby making the first line operational and the second line idle.

As shown in FIG. 3C, the conventional control method may be based on both time and temperature. At 310, it is determined whether the discharge temperature of the superheated vapor from the duty bank of AAV units is less than the set-point SP2. When the discharge temperature is less than the set-point SP2, control signals are sent to the control valves to switch the idle and duty banks of AAV units, at 312. When the discharge temperature is greater than or equal to the set-point SP2, it is determined whether the runtime of the duty bank of AAV units is greater than the set-point SP1, at 314. When the runtime is greater than the set-point SP1, a control signal is sent to the control valves to switch the idle and duty banks of AAV units, at 312. When the runtime is less than or equal to the set-point SP1, the discharge temperature is compared to the set-point SP2, at 310.

For example, referring back to FIG. 2, when the signal X3 indicates that the temperature detected at the temperature sensor 212 falls below the set-point SP2, the processor or controller sends control signals 228 and 230 to the first and second control valves 204 and 208 to switch the idle and duty banks of AAV units. When the signal X3 indicates that the temperature detected at the RTD 212 is at or above the set-point SP2, the runtime of the timer 214 is checked. When the signal Z2 indicates that a count of the timer 214 exceeds the set-point SP1, the processor or controller sends control signals 228 and 230 to the first and second control valves 204 and 208 to switch the idle and duty banks of AAV units.

Accordingly, the duty bank continues running until one of the thresholds, SP1 or SP2, is met. However, the switching is controlled by monitoring only the duty bank of AAVs, regardless of whether the idle bank is fully defrosted. If the idle bank is not fully defrosted, its vaporization capacity is not fully restored, and performance is degraded when it is used as the duty bank in the next cycle. Further, it is possible for this degradation to become an endless loop in which capacity of the two banks of AAV units degrades over time and is never restored.

Additionally, with respect to FIGS. 2 and 3A-3C, the switching of the AAV banks is controlled by monitoring only the runtime and/or discharge temperature of the duty bank, regardless of frosting and/or icing characteristics of the duty bank. Accordingly, while the runtime and/or discharge temperature does not indicate it is time to switch AAV banks, frosting and/or icing on the duty bank may make its defrosting process inefficient and slow when it becomes the idle bank in the next cycle. Such frosting and/or icing characteristics include, for example, the conversion of rime or frost to ice, ice bridging across tube fins, and ice blocking spaces between tube fins.

Further, with respect to FIGS. 2 and 3A-3C, the switching of the AAV banks is controlled by monitoring only vaporizer performance regardless of dynamic changes in ambient conditions where the system is running. Runtime and discharge temperature set-points that are suitable for one ambient condition may not suit another ambient condition. For example, warm and/or humid ambient conditions may result in quicker defrosting and require a shorter switching cycle, while cold and/or dry ambient conditions may result in slower defrosting and require a longer switching cycle.

SUMMARY

According to one embodiment, a method for controlling a cryogenic vaporization system is provided. A liquid cryogen is provided to a first bank of AAV units via at least one control valve of the cryogenic vaporization system. A superheated vapor is output from the first bank of AAV units. A controller of the cryogenic vaporization system determines whether a temperature of the output superheated vapor is less than a temperature threshold. When the temperature of the output superheated vapor is less than the temperature threshold, the at least one control valve switches the provision of the liquid cryogen to a second bank of AAV units. The second bank of AAV units is connected in parallel with the first bank of AAV units. When the temperature of the output superheated vapor is greater than or equal to the temperature threshold, The controller determines whether the second bank of AAV units is defrosted. When the second bank of AAV units is defrosted, the at least one control valve switches the provision of the liquid cryogen to the second bank of AAV units.

According to one embodiment, a cryogenic vaporization system is provided. The system includes a first bank of AAV units configured for receiving a liquid cryogen and outputting superheated vapor, and a second bank of AAV units configured for receiving the liquid cryogen and outputting the superheated vapor. The second bank of AAV units is connected in parallel with the first bank of AAV units. The system also includes at least one control valve providing liquid cryogen to one of the first bank of AAV units and the second bank of AAV units, and a sensor that detects a temperature of the superheated vapor output from the first bank of AAV units and the second bank of AAV units. The system further includes a first plurality of sensors measuring a surface temperature at the second bank of AAV units. Additionally, the system includes a controller configured to determine, via the sensor, whether the temperature of the superheated vapor is less than a temperature threshold. The controller is also configured to control the at least one control valve to switch the provision of the liquid cryogen to the second bank of AAV units, when the temperature of the output superheated vapor is less than the temperature threshold. The controller is further configured to determine whether the second bank of AAV units has defrosted based on the first plurality of sensors, when the temperature of the output superheated vapor is greater than or equal to the temperature threshold. Additionally, the controller is configured to control the at least one control valve to switch the provision of the liquid cryogen to the second bank of AAV units, when the second bank of AAV units is defrosted.

BRIEF DESCRIPTION OF THE DRAWINGS

The above and other aspects, features, and advantages of certain embodiments of the present disclosure will be more apparent from the following detailed description, when taken in conjunction with the accompanying drawings, in which.

DETAILED DESCRIPTION

Figure 1:
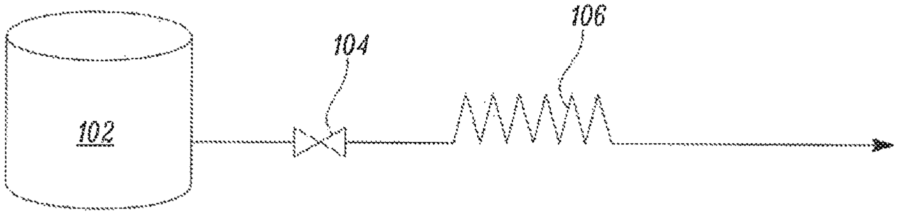
FIG. 1 is a diagram illustrating typical cryogenic regasification system.
Figure 2:
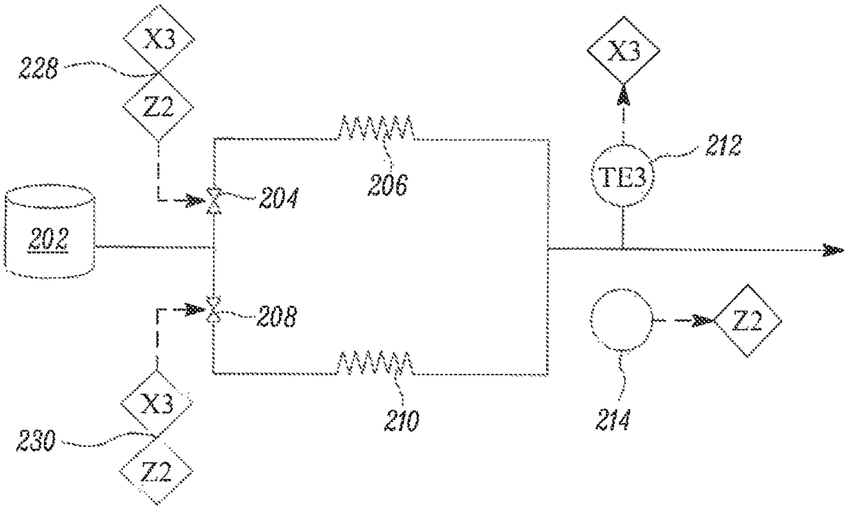
FIG. 2 is a diagram illustrating a typical AAV regasification system.
Figure 3A:
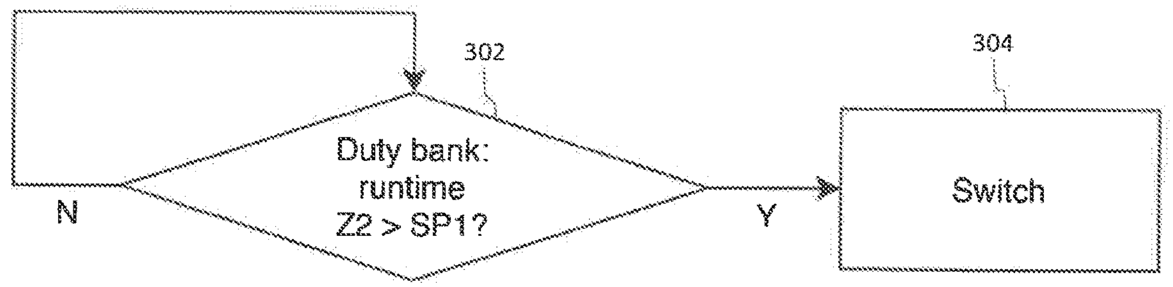
FIGS. 3A-3C are flowcharts illustrating conventional control methods for an AAV regasification system.
Figure 3B:
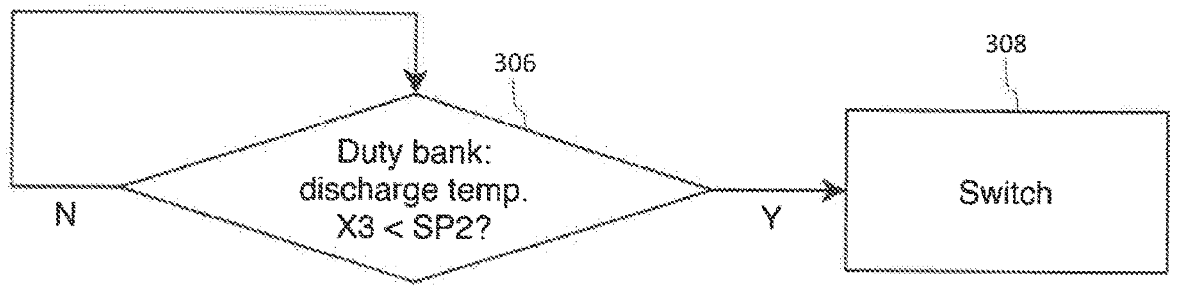
Figure 3C:
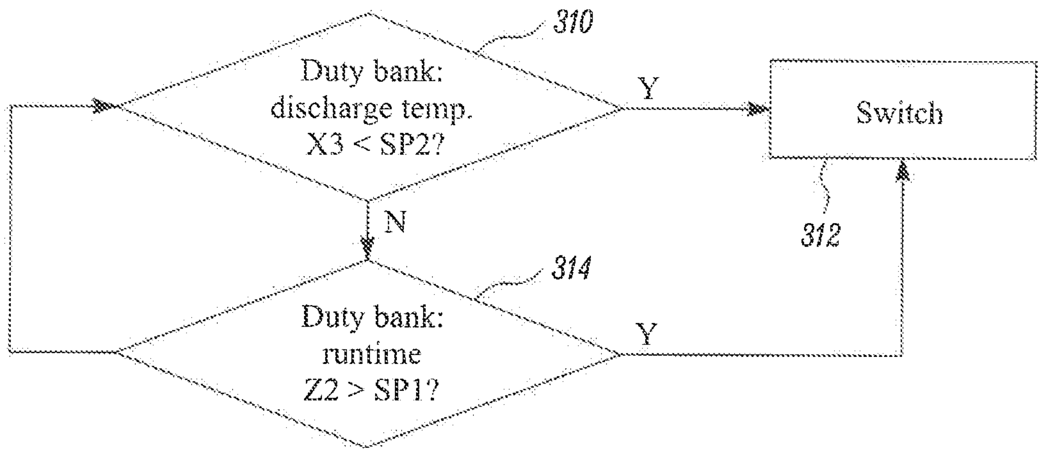

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate the existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

Figure 4:
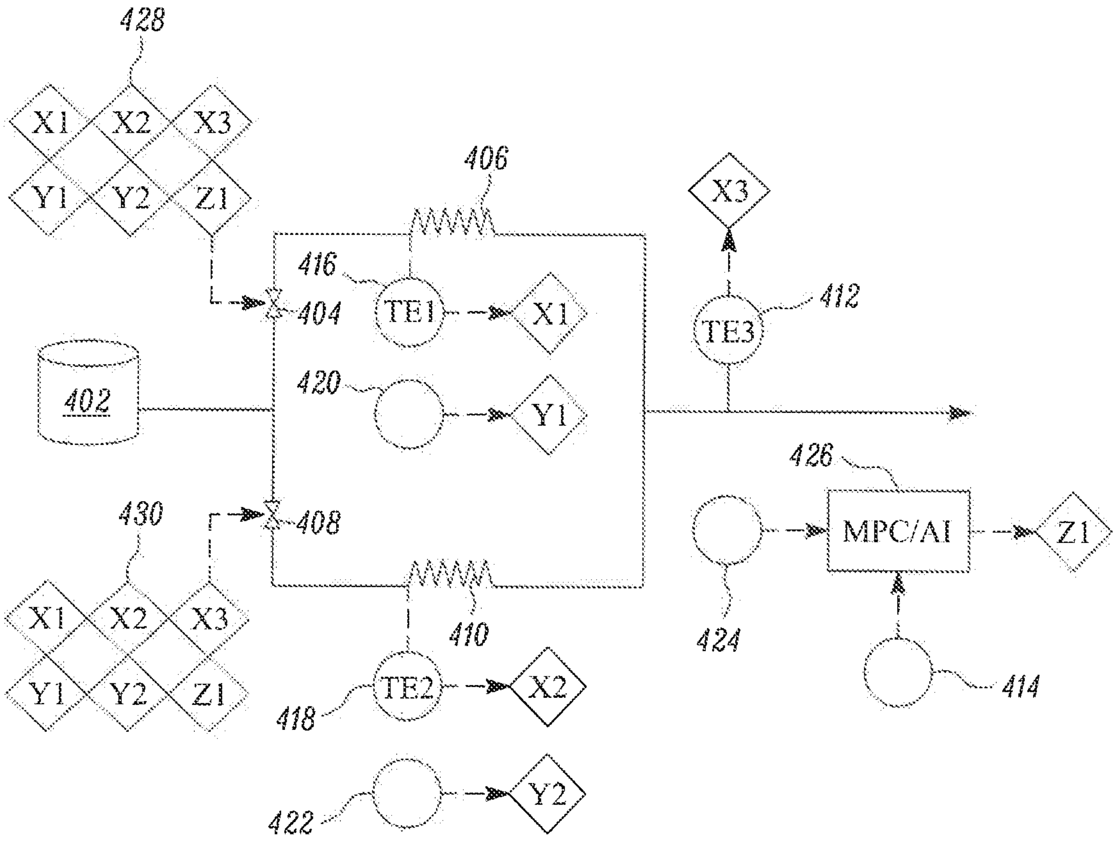
FIG. 4 is a diagram illustrating an AAV regassification system, according to an embodiment of the disclosure.

Referring now to FIG. 4, a diagram illustrates an AAV regasification system, according to an embodiment of the disclosure. A liquid cryogen storage tank 402 stores liquid cryogen and provides the liquid cryogen to first and second parallel lines. On the first line, a first control valve 404 controls the flow of the liquid cryogen to a first bank of AAV units 406. On the second line, a second control valve 408 controls the flow of the liquid cryogen to a second bank of AAV units 410. Only one of the first and second parallel lines is operative at a given time, and thus, when one control valve is open, the other control valve is closed. Alternative embodiments may include one or more additional parallel lines of AAV units, and different numbers of control valves and banks on each line.

After regassification of the liquid cryogen, and the first and second lines are rejoined, a first temperature sensor, such as, for example, an RTD 412, measures a discharge temperature of the superheated vapor that is output from the duty bank of AAV units (e.g., the first bank of AAV units 406 or the second bank of AAV units 410). A signal X3 may be sent from the first temperature sensor 412 to a controller or processor to be utilized by the controller or processor in determining whether to switch the idle and duty banks of AAV units via control of the first and second control valves 404 and 408. In alternative embodiments, the controller or processor may be embodied as a model predictive controller (MPC) 426.

A second temperature sensor 416 is disposed on the first bank of AAV units 406, which measures a temperature at the disposed position on the first bank of AAV units 406. The second temperature sensor may be embodied as a thermocouple or an RTD. In an alternative embodiment, a plurality of temperature sensors are disposed at a plurality of positions on the first bank of AAV units 406. Specifically, the second temperature sensor 416 is placed on finned tubes of the first bank of AAV units 406. Alternative embodiments may utilize other temperature measurement means without departing from the scope of the disclosure. A signal X1 with temperature information may be sent from the second temperature sensor 416 to the controller or processor (or the MPC 426) to be utilized by the controller or processor, in combination with other received signals, in determining whether to switch the idle and duty banks of AAV units via control of the first and second control valves 404 and 408.

A third temperature sensor 418 is disposed on the second bank of AAV units 410, which measures a temperature at the disposed position on the second bank of AAV units 410. The third temperature sensor may be embodied as a thermocouple or an RTD. In an alternative embodiment, a plurality of temperature sensors are disposed at a plurality of positions on the second bank of AAV units 410. Specifically, the third temperature sensor 418 is placed on finned tubes of the second bank of AAV unis 410. Alternative embodiments may utilize other temperature measurement means without departing from the scope of the disclosure. A signal X2 with temperature information may be sent from the third temperature sensor 418 to the controller or processor (or the MPC 426) to be utilized by the controller or processor, in combination with other received signals, in determining whether to switch the idle and duty banks of AAV units via control of the first and second control valves 404 and 408.

A first infrared (IR) camera unit 420 is disposed within view of the first bank of AAV units 406, which captures thermal imaging of the finned tubes of the first bank of AAV units 406 using infrared radiation. In an alternative embodiment, a plurality of IR camera units are disposed within view of the first bank of AAV units 406. Alternative embodiments may also utilize other thermal imaging means without departing from the scope of the disclosure. A signal Y1 of the thermal imaging may be sent from the first IR camera unit 420 to the controller or processor (or the MPC 426) for analysis to determine frost and ice profiles and behavior on the fined tubes of the first bank of AAV units 406. The frost and ice profiles and behaviors are utilized by the controller or processor, in combination with other received signals, in determining whether to switch the idle and duty banks of AAV units via control of the first and second control valves 404 and 408.

A second IR camera unit 422 is disposed within view of the second bank of AAV units 410, which captures thermal imaging of the finned tubes of the second bank of AAV units 410 using infrared radiation. In an alternative embodiment, a plurality of IR camera units are disposed within view of the second bank of AAV units 410. Alternative embodiments may also utilize other thermal imaging means without departing from the scope of the disclosure. A signal Y2 of the thermal imaging may be sent from the second IR camera unit 422 to the controller or processor (or the MPC 426) for analysis to determine the frost and ice profiles and behavior on the fined tubes of the second bank of AAV units 410. The frost and ice profiles and behaviors are utilized by the controller or processor, in combination with other received signals, in determining whether to switch the idle and duty banks of AAV units via control of the first and second control valves 404 and 408.

A weather station 424 is installed and utilized to monitor changes in ambient weather conditions including, for example, ambient temperature, humidity, wind, and precipitation. The weather station 424 is in communication with the MPC 426, and the monitored changes in ambient weather conditions are sent from the weather station 424 to the MPC 426.

A timer 414 tracks a runtime of the duty bank of AAV units (e.g., the first bank of AAV units 406 or the second bank of AAV units 410) based on a preset switching cycle for the first and second AAV units. This switching cycle is originally preset by the MPC 426 based on ambient weather conditions received from the weather station 424. The remaining runtime for the duty bank of AAV units, with respect to the switching cycle, is provided from the timer 414 to the MPC 426.

The monitored weather changes and remaining runtime are used in combination by the MPC 426 to generate a signal Z1 indicating whether favorable ambient conditions exist for defrosting the idle bank of AAV units. The signal Z1 is sent to the processor or controller (or remains with the MPC 426) and is used, in combination with other received signals, in determining whether to switch the idle and duty banks of AAV units via control of the first and second control valves 404 and 408.

Upon reception of the signals X1, X2, X3, Y1, Y2, and Z1, the processor or controller (or the MPC 426) makes a determination whether to switch the idle and duty banks of AAV units. When a determination is made to switch the idle and duty banks of AAV units, the processor or controller (or the MPC 426) sends a first control signal 428 to the first control valve 404 and sends a second control signal 430 to the second control valve 408. One of the first and second control signals 428 and 430 is a signal to open a closed control valve, and the other of the first and second control signals 428 and 430 is a signal to close an open control valve, enabling the switching of the idle and duty banks of AAV units.

Figure 5:
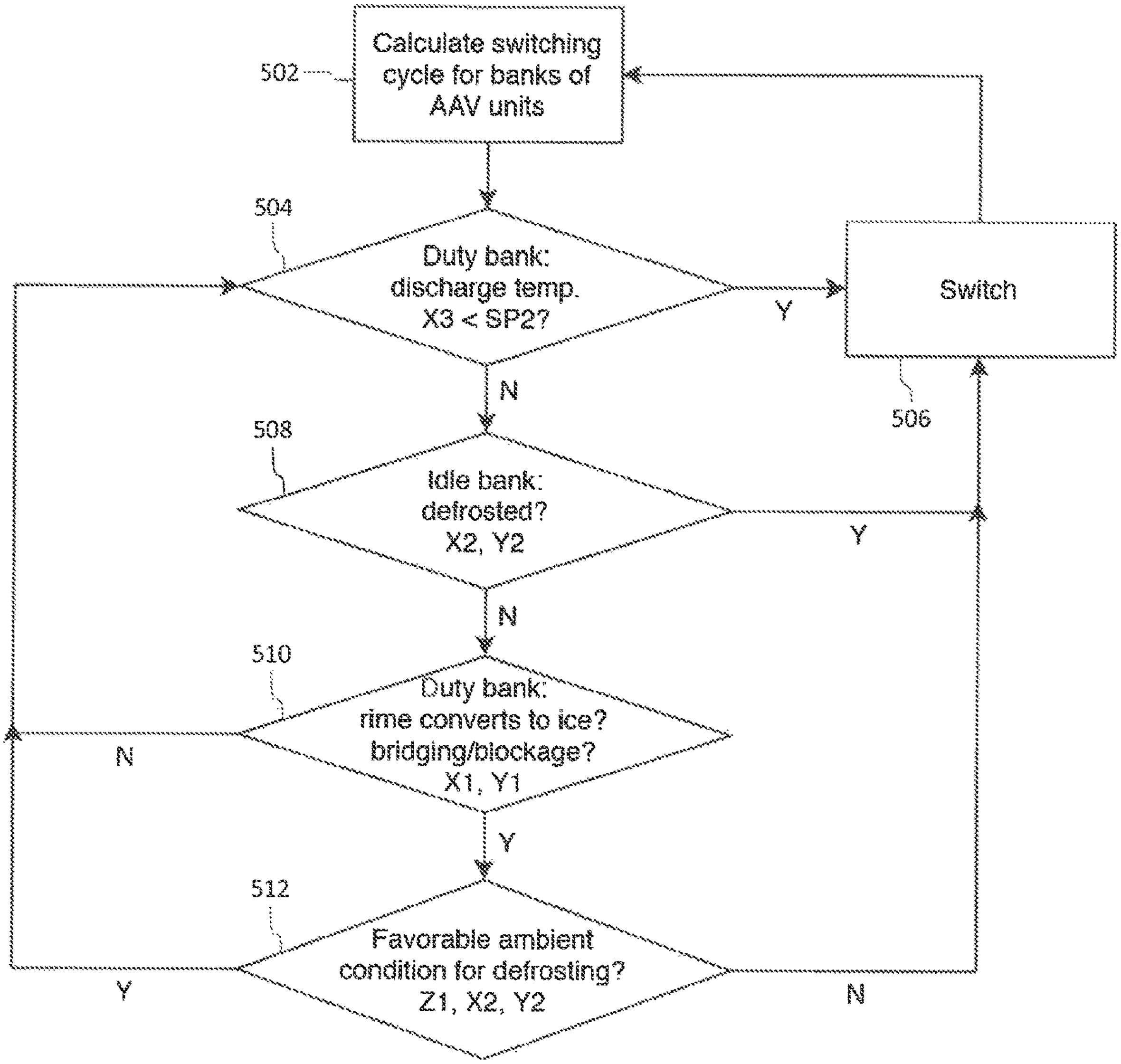
FIG. 5 is a flowchart illustrating a control method for an AAV regasification system, according to an embodiment of the disclosure.

FIG. 5 is a flowchart illustrating a method for controlling an AAV regasification system, according to an embodiment of the disclosure. As described above with respect to FIG. 4, additional conditions are obtained and utilized to determine whether to switch idle and duty banks of AAV units via control valves.

Initially, at 502, the MPC 426 calculates a switching cycle for the first and second AAV units based on ambient conditions. The ambient conditions are provided to the MPC 426 from the weather station 424, and the switching cycle is provided from the MPC 426 to the timer 414 as a switching cycle or the set-point SP1. The set-point SP1 may be calculated dynamically with the dynamic change of ambient conditions. A switching cycle may range from 1 hour to 8 hours.

At 504, it is determined whether a discharge temperature of the superheated vapor from the duty bank of AAV units is less than the set-point SP2. When the discharge temperature is less than the set-point SP2, the control valves switch the idle and duty banks of AAV units, at 506. According to one embodiment, SP2 may be set to approximately −20° F.

For example, referring back to FIG. 4, when the signal X3 indicates that a temperature detected at the first temperature sensor 412 falls below the set-point SP2, the processor or controller (or the MPC 426) sends a control signal to the first and second control valves 404 and 408. When the first line is operational and the second line is idle upon reception of the signal X3, the first control signal 428 closes the first control valve 404 and the second control signal 430 opens the second control valve 408, thereby making the second line operational and the first line idle. When the second line is operational and the first line is idle upon reception of the signal X3, the second control signal 430 closes the second control valve 408 and the first control signal 428 opens the first control valve 404, thereby making the first line operational and the second line idle.

When the discharge temperature is greater than or equal to the set point SP2, it is determined whether the idle bank of AAV units has defrosted, at 508. Such a determination is made by the processor or controller (or the MPC 426) based on a signal (X1 or X2) indicating temperature and received from a temperature sensor (416 or 418 of FIG. 4) disposed on finned tubes of the idle bank of AAV units. The determination is also made by the processor or controller based on a signal (Y1 or Y2) of thermal imaging of the finned tubes of the idle bank of AAV units, which is received from an IR camera unit (420 or 422 of FIG. 4) directed at the idle bank of AAV units. The processor or controller (or the MPC 426) analyzes the thermal imaging to determine frost and ice profiles and behavior on the finned tubes of the idle bank of AAV units. Accordingly, a determination of whether the idle bank of AAV units has defrosted is based on the received temperature information and determined frost and ice profiles and behavior. For example, if the temperature of the surface of the finned tube has reached the minimum of an ambient temperature and 0° C., the idle bank may be deemed to be defrosted. Additionally, if the thermal imaging indicates that no frost or ice remains on the surface of the finned tubes, the idle bank may be deemed to be defrosted.

When it is determined that the idle bank of AAV units has defrosted, the control valves switch the idle and duty banks of AAV units, at 506. For example, referring back to FIG. 4, the processor or controller (or the MPC 426) sends the first and second control signals 428 and 430 to the first and second control valves 404 and 408, switching the idle and duty banks of AAV units, as described above. This prevents any additional accumulation of frost or ice on the duty bank of AAV units, when the idle bank of AAV units has already fully defrosted, thereby preventing unnecessary additional defrosting in a subsequent cycle and increasing the efficiency of the regasification system.

When it is determined that the idle bank of AAV units has not defrosted, it is determined whether the duty bank of AAV units has evidence of rime converting to ice or ice-bridging or -blockage on the finned tubes, at 510. Such a determination is made by the processor or controller (or the MPC 426) based on a signal (X1 or X2) indicating temperature and received from a temperature sensor (416 or 418 of FIG. 4) disposed on the finned tubes of the duty bank of AAV units. The determination is also made by the processor or controller (or the MPC 426) based on a signal (Y1 or Y2) of thermal imaging of the finned tubes of the duty bank of AAV units. The processor or controller (or the MPC 426) analyzes the thermal imaging to determine frost and ice profiles and behavior on the fined tubes of the duty bank of AAV units. Accordingly, a determination of whether the duty bank of AAV units has evidence of rime converting to ice or ice-bridging or -blockage is based on the received temperature information and determined frost and ice profiles and behavior.

For example, if the temperature of the surface of the finned tubes has dropped to a threshold value or range, it indicates that rime has converted to ice. However, this threshold value or range is dependent on specific ambient conditions (e.g., temperature, humidity, and wind), and specific process conditions (e.g., fluid type, inlet temperature and pressure, and flowrate). The thermal imaging may show a temperature field as well as frost and/or ice profiles, which indicates if ice bridging or blocking has occurred.

When it is determined that the duty bank of AAV units does not have evidence of rime converting to ice or ice-bridging or -blockage on the finned tubes, the discharge temperature of the superheated vapor is rechecked and compared to the set-point SP2, at 504. Accordingly, the duty bank of AAV units is permitted to continue to run while the idle bank of AAV units continues to defrost.

When it is determined that the duty bank of AAV units has evidence of rime converting to ice or ice-bridging or -blockage on the finned tubes, it is determined whether the idle bank of AAV units is in a favorable ambient condition for defrosting, at 512. Such a determination is made by the processor or controller (or the MPC 426) based on a signal received from the weather station 424, which monitors changes in ambient weather conditions including, for example, ambient temperature, humidity, wind, and precipitation. This determination is also made by the processor or controller (or the MPC 426) based on an amount of runtime remaining for the duty bank of AAV units based on the preset switching cycle and the set-point SP1 at the timer 414. The MPC 426 generates the signal Z1 based on the ambient weather conditions and remaining runtime in a switching cycle of banks of AAV units.

The determination of whether the idle bank of AAV units is in a favorable ambient condition for defrosting is also made by the processor or controller (or the MPC 426) based on a signal (X1 or X2) indicating temperature and received from a temperature sensor (416 or 418 of FIG. 4) disposed on finned tubes of the idle bank of AAV units. The determination is also made by the processor or controller based on a signal (Y1 or Y2) of thermal imaging of the finned tubes of the idle bank of AAV units, which is received from an IR camera unit (420 or 422 of FIG. 4) directed at the idle bank of AAV units. The processor or controller (or the MPC 426) analyzes the thermal imaging to determine frost and ice profiles and behavior on the finned tubes of the idle bank of AAV units.

Accordingly, a determination of whether the idle bank of AAV units is in a favorable ambient condition for defrosting is based on the ambient weather conditions and remaining runtime (Z1), the received temperature information (X1 or X2), and the determined frost and ice profiles and behavior (Y1 or Y2).

Whether an idle bank is in a favorable ambient condition for defrosting is determined by comparing a calculated additional time needed for defrosting with the remaining runtime. The additional time needed for defrosting is calculated from remaining frost and/or ice quantities (obtained via temperature sensor(s) and IR camera(s)) and specific ambient conditions (obtained via the weather station). If the additional time needed is less than or equal to the remaining runtime, the idle bank is in a favorable ambient condition for defrosting. If the additional time needed is greater than the remaining runtime, the idle bank is not in a favorable ambient condition for defrosting.

When it is determined that the idle bank of AAV units is in a favorable ambient condition for defrosting, the discharge temperature of the superheated vapor is rechecked and compared to the set-point SP2, at 504. Accordingly, since the favorable ambient condition is indicative of continued defrosting, the idle bank of AAV units is permitted to continue to defrost while the duty bank of AAV units continues to run, despite the indication of ice on the finned tubes of the duty bank of AAV units.

When it is determined that the idle bank of AAV units is not in a favorable ambient condition for defrosting, the control valves switch the idle and duty banks of AAV units, at 506. For example, referring back to FIG. 4, the processor or controller (or the MPC 426) sends the first and second control signals 428 and 430 to the first and second control valves 404 and 408, switching the idle and duty banks of AAV units, as described above. Accordingly, since the ambient conditions are not indicative of continued defrosting, the additional build-up of ice on the duty bank of AAV units is prevented by switching the idle and duty banks of AAV units.

After switching the idle and duty banks of AAV units at 506, the controller or processor (or the MPC 426) recalculates a switching cycle for the first and second AAV units based on ambient conditions, at 502. Alternatively, the discharge temperature of the superheated vapor may be rechecked and compared to the set-point SP2, at 504, without recalculating the switching cycle.

The reliability, efficiency, and flexibility of the above-described AAV regasification system is improved by monitoring not only the duty bank performance, but also the defrosting of the idle bank, the frost/ice characteristics of the duty bank, and the dynamic change of ambient conditions where the system is running.

Potential capital savings can be achieved by designing an AAV regassification system for a typical, but not necessarily the worst, ambient condition in a geographic location. Embodiments of the disclosure can help operate the AAV regassification system efficiently in unfavorable ambient conditions.

Figure 6:
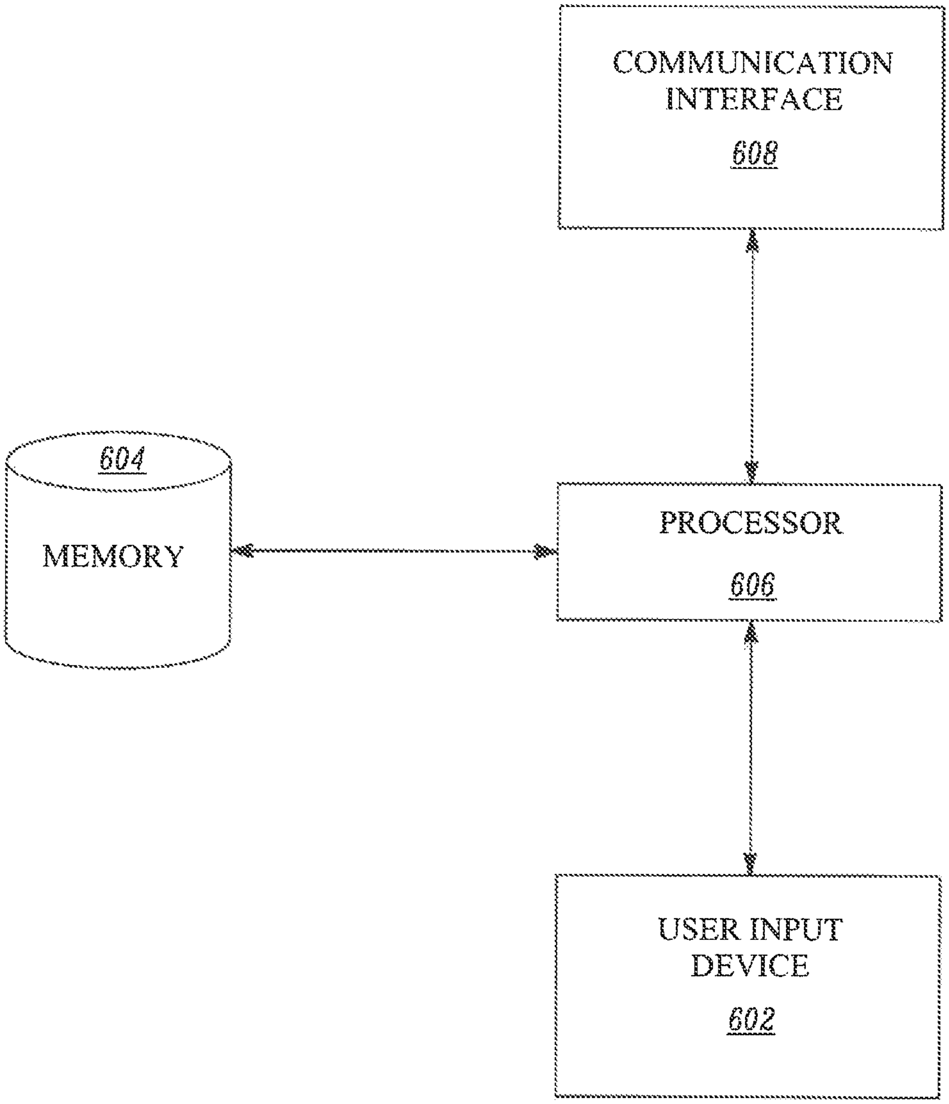
FIG. 6 is a block diagram illustrating a controller for controlling an AAV regasification system, according to an embodiment of the disclosure.

FIG. 6 is a block diagram illustrating a controller for controlling an AAV regasification system, according to an embodiment. The processor or controller may be embodied as an MPC, and may include at least one user input device 602 and a memory 604. The memory 604 may include instructions that allow a processor 606 to analyze thermal imaging, and determine when to switch idle and duty banks of AAV units.

The apparatus also includes the processor 606 for determining when to switch between the parallel paths of banks of AAV units. For example, the processor 606 may accept inputs from the first temperature sensor 412, the second temperature sensor 416, the third temperature sensor 418, the first IR camera unit 420, the second IR camera unit 422, the weather station 424, and the timer 414, and utilize such inputs to determine when to switch between multiple banks of AAV units. The processor may also control the first and second control valves 404 and 408 to enable the switching. Further, the processor may analyze thermal imaging from the first and second IR camera units 420 and 422, and determine a runtime of the timer 414 based on input from the weather station 424. Additionally, the apparatus may include a communication interface 608 that receives signals, such as, for example, X1, X2, X3, Y1, Y2, and Z1, and transmits signals, such as, for example, first and second control signals 428 and 430.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for controlling a cryogenic vaporization system, the method comprising:
- providing, via at least one control valve of the cryogenic vaporization system, a liquid cryogen to a first bank of ambient air vaporization (AAV) units;
- outputting a superheated vapor from the first bank of AAV units;
- determining, by a controller of the cryogenic vaporization system, whether a temperature of the output superheated vapor is less than a temperature threshold;
- when the temperature of the output superheated vapor is less than the temperature threshold, switching, via the at least one control valve, the provision of the liquid cryogen to a second bank of AAV units, wherein the second bank of AAV units is connected in parallel with the first bank of AAV units;
- monitoring defrosting of the second bank of AAV units using at least one of an infrared (IR) camera and a temperature sensor associated with the second bank of AAV units
- when the temperature of the output superheated vapor is greater than or equal to the temperature threshold, determining, by the controller, whether the second bank of AAV units is defrosted;
- when the second bank of AAV units is defrosted, switching, via the at least one control valve, the provision of the liquid cryogen to the second bank of AAV units.

2. The method of claim 1, further comprising detecting, via a sensor, the temperature of the output superheated vapor.

3. The method of claim 1, further comprising:
- when the second bank of AAV units is not defrosted, determining, by the controller, whether ice has formed on the first bank of AAV units;
- when ice has not formed on the first bank of AAV units, repeating steps beginning with the determination of whether the temperature of the output superheated vapor is less than the temperature threshold.

4. The method of claim 3, further comprising monitoring formation of the ice on the first bank of AAV units using at least one of an IR camera and a temperature sensor associated with the first bank of AAV units.

5. The method of claim 3, further comprising:
- when ice has formed on the first bank of AAV units, determining, by the controller, whether a current ambient condition is favorable to defrosting the second bank of AAV units;
- when the current ambient condition is not favorable to defrosting of the second bank of AAV units, switching, via the at least one control valve, the provision of the liquid cryogen to the second bank of AAV units; and
- when the current ambient condition is favorable to defrosting the second bank of AAV units, repeating steps beginning with the determination of whether the temperature of the output superheated vapor is less than the temperature threshold.

6. The method of claim 5, further comprising determining the current ambient condition based on at least one of current ambient weather monitored at a weather station coupled to the controller, a remaining runtime for the first bank of AAV units, a temperature at the second bank of AAV units, and frost and ice profiles and behavior at the second bank of AAV units.

7. A cryogenic vaporization system, the system comprising:
- a first bank of ambient air vaporization (AAV) units configured for receiving a liquid cryogen and outputting a cryogenic vapor;
- a second bank of AAV units configured for receiving the liquid cryogen and outputting the superheated vapor, the second bank of AAV units being connected in parallel with the first bank of AAV units;
- at least one control valve providing liquid cryogen to one of the first bank of AAV units and the second bank of AAV units;
- a sensor that detects a temperature of the superheated vapor output from the first bank of AAV units and the second bank of AAV units;
- a first plurality of sensors configured for measuring a surface temperature at the second bank of AAV units, the first plurality of sensors comprising at least one of an infrared (IR) camera and a temperature sensor;
- a controller configured to:
  - determine, via the sensor, whether the temperature of the superheated vapor is less than a temperature threshold;
  - control the at least one control valve to switch the provision of the liquid cryogen to the second bank of AAV units, when the temperature of the output superheated vapor is less than the temperature threshold;
  - determine whether the second bank of AAV units has defrosted based on the first plurality of sensors, when the temperature of the output superheated vapor is greater than or equal to the temperature threshold; and
  - control the at least one control valve to switch the provision of the liquid cryogen to the second bank of AAV units, when the second bank of AAV units is defrosted.

8. The cryogenic vaporization system of claim 7, further comprising a second plurality of sensors measuring a surface temperature at the first bank of AAV units, wherein the controller is further configured to:

determine whether ice has formed on the first bank of AAV units based on the second plurality of sensors, when the second bank of AAV units is not defrosted; and when ice has not formed on the first bank of AAV units, repeat steps beginning with the determination of whether the temperature of the output superheated vapor is less than the temperature threshold.

9. The cryogenic vaporization system of claim 8, wherein the second plurality of sensors comprises at least one of an infrared (IR) camera and a temperature sensor associated with the first bank of AAV units.

10. The cryogenic vaporization system of claim 8, further comprising a weather station coupled to the controller and monitoring a current ambient weather condition, wherein the controller is further configured to:

determine, based on the weather station, whether a current ambient condition is favorable to defrosting the second bank of AAV units, when ice has formed on the first bank of AAV units;

when the current ambient condition is not favorable to defrosting of the second bank of AAV units, control the at least one control valve to switch the provision of the liquid cryogen to the second bank of AAV units; and when the current ambient condition is favorable to defrosting the second bank of AAV units, repeat steps beginning with the determination of whether the temperature of the output superheated vapor is less than the temperature threshold.

11. The cryogenic vaporization system of claim 10, wherein the controller is further configured to:

determine the current ambient condition based on at least one of the current ambient weather condition, a remaining runtime for the first bank of AAV units, a temperature at the second bank of AAV units, and frost and ice profiles and behavior at the second bank of AAV units.

* * * * *